United States Patent [19]
Colella

[11] Patent Number: 6,051,809
[45] Date of Patent: Apr. 18, 2000

[54] SELF-CONTAINED INTEGRATED WELDER/ GENERATOR AND COMPRESSOR

[76] Inventor: Joe L. Colella, 614 Old Thomasville Rd., High Point, N.C. 27260

[21] Appl. No.: 09/059,767

[22] Filed: Apr. 14, 1998

[51] Int. Cl.⁷ ...................................................... B23K 9/10
[52] U.S. Cl. ............................................ 219/133; 219/134
[58] Field of Search .................................. 219/133, 134; 290/1 A, 1 R

[56] References Cited

U.S. PATENT DOCUMENTS

| | | | |
|---|---|---|---|
| 2,364,013 | 11/1944 | Waseige | 290/1 A |
| 3,514,219 | 5/1970 | Mitchell | 417/364 X |
| 4,173,951 | 11/1979 | Ishihara | 123/2 |
| 5,087,824 | 2/1992 | Nelson | 290/1 R |
| 5,341,644 | 8/1994 | Nelson | 290/1 A |

OTHER PUBLICATIONS

Flyer: "*Instruction Manual*: PCM–500i Plasma Arc Cutting Packages" Jun., 1996.

Burco/Mosa TS 200 Model 5000, two pages.

Burco/Mosa MSG 200 / 201S, two pages.

"Engine Driven Welders" marketed by "Lincoln Electric" Power Arc 4000, 5000, Ranger 8, Ranger 8 LPG from Thomas Register search at http://www4.thomasregister.com, Aug. 7, 1997.

*Primary Examiner*—Patrick Ryan
*Assistant Examiner*—Anjan Dey
*Attorney, Agent, or Firm*—Kennedy, Covington, Lobdell & Hickman, LLP

[57] ABSTRACT

A self-contained, portable and fully integrated welder/ generator and compressor unit including a housing sized to fit in the back of a pick-up truck, and an engine, an alternator and an air compressor arranged in alignment with one another within the housing. The engine drives the alternator directly, and a pulley arrangement is provided between a take-off shaft of the alternator to drive the compressor. The components within the housing are arranged to provide a storage space for welding tools, nail guns and the like and the like within the housing.

9 Claims, 6 Drawing Sheets

SELF-CONTAINED INTEGRATED WELDER/ GENERATOR AND COMPRESSOR

BACKGROUND OF THE INVENTION

The present invention relates generally to welder/generator and compressor units that can be transported to a site for welding or for operating air or electric power tools, and more particularly to a unit of this type that can be carried in the bed of a pickup truck.

Portable units that can be carried to a site are known, and a typical unit of this type, such as a TS 200, Model 5000 welder/generator sold by Burco/Mosa, includes an open, lightweight frame consisting of metal tubing on which is mounted an internal combustion engine directly connected to an alternator which generates sufficient amps to operate direct current welders and to provide some auxiliary alternating current for operating auxiliary equipment, such as a compressor that may be used to providing the compressed air needed to operate a plasma cutting torch used in conjunction with the welding equipment.

While units of this type operate satisfactorily, they have several disadvantages. First, and most importantly, even though the welder/generator or compressor are portable, it is nevertheless difficult and time consuming to load and unload, then connect up the various components which are included in the system. More specifically, in a typical operation, the portable welder/generator, which may weigh approximately 200 pounds, is lifted onto the bed of a pickup truck. Because it is so heavy, it is usually placed at the rear of the bed to avoid unnecessary lifting, and because it is so big, it creates an obstacle that makes it difficult to place any significant equipment in the pickup truck. Next, the aforesaid compressor, which is a separate unit and also heavy (e.g. 150 pounds), must be lifted and placed on the bed of the pickup truck. At the job site, these units are generally unloaded from the truck, and in any event, they must be connected to one another, and with the welding and plasma cutting equipment, all of which is time consuming and often requires additional lifting of heavy equipment.

Moreover, even though the individual components of the system are relatively heavy, they nevertheless can be stolen and carried away from the back of a pickup truck, and therefore it is the general practice of those who use such equipment to unload and properly store the equipment in a secure location at the end of each working day, and again, this results is a significant amount of lifting of heavy equipment. The same is true for smaller, auxiliary tools that are used with these units, such as plasma cutters, mig welders and/or welding leads, all of which must also be removed from the truck and stored.

Finally, in such known units, the tubular frame in which the internal combustion engine and the alternator are carried is entirely open, and, as a result, workman and others located near the equipment are constantly exposed to very high levels of noise resulting from the operation of the engine, the alternator, and the associated compressor unit.

In accordance with the present invention, a self-contained and fully integrated welder/generator and compressor unit is provided which overcomes or at least ameliorates the aforesaid disadvantages of known equipment of the aforesaid type.

SUMMARY OF THE INVENTION

In accordance with the present invention, a self-contained and fully integrated welder/generator and compressor unit is provided that is capable of being loaded onto and carried by a pick-up, such unit comprising a housing having an extending length corresponding generally to the width of a pick-up truck, and having a vertical height for receiving and containing components. An engine is mounted within said housing, and an electrical current generating alternator is also mounted within said housing and connected to the engine to be driven thereby, and the alternator has an output drive shaft. An air compressor having a compressed air outlet is also mounted within said housing, and a drive assembly is mounted within the housing and connects the output drive shaft of the alternator to the air compressor to drive the compressor. An output panel is located in a wall of the housing and including electrical outlets and welding lead receptacles connected to the alternator.

In the preferred embodiment of the present invention, the housing is T-shaped in cross section along its extending length to provide two end portions for overlapping and resting on the side walls of the bed of the pickup truck, and one of the end portions includes a side wall for receiving the output panel.

A compressed air accumulator tank is also preferably mounted in the housing and is connected to the compressed air output of the air compressor, such accumulator tank having a vertical height that is substantially less than the vertical height of the housing, and the housing is formed with a shelf located above the air compressor to provide a storage compartment for welding tools, nail guns and the like within the housing.

Within the housing, the engine, alternator, compressor, and air accumulator tank are all preferably mounted in alignment with one another along the extending length of the housing, and the aforesaid drive assembly preferably includes a drive pulley mounted on the output shaft of the alternator, a driven pulley mounted on the compressor to drive the compressor, and an intermediate pulley and belt arrangement which acts as a speed reduction unit between the drive pulley and the driven pulley.

DESCRIPTION OF THE PREFERRED EMBODIMENT

Figure 1:
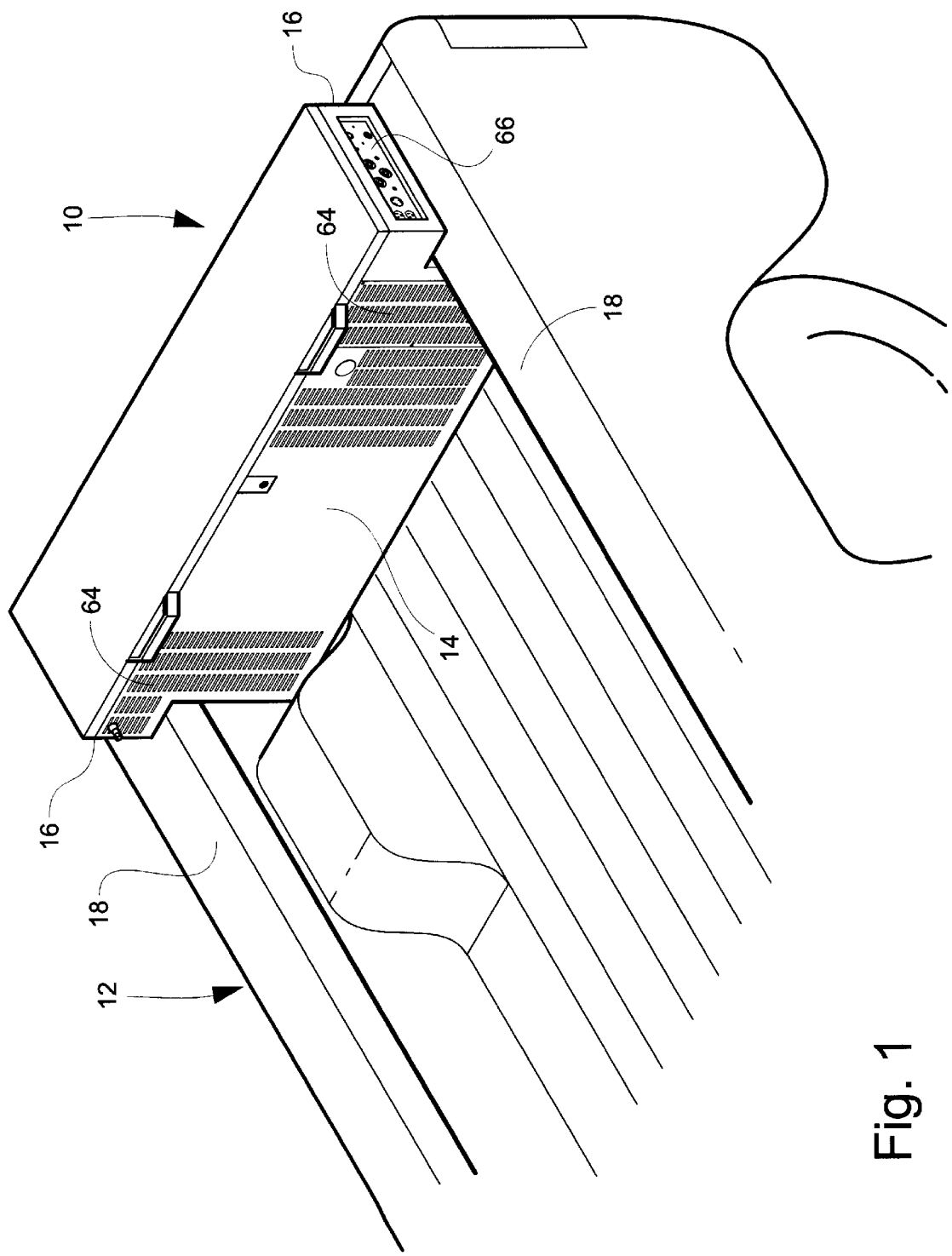
FIG. 1 is a general perspective view of the unit of the present invention located in the bed of a pickup truck.

Looking now in greater detail at the accompanying drawings, FIG. 1 illustrates the self-contained, portable and fully-integrated welder/generator and compressor unit 10 of the present invention loaded onto the back of a typical pick-up truck 12. The unit 10 includes a housing 14 which is T-shaped and has a longitudinal length corresponding generally to the width of the bed of the pick-up truck 12, and the housing is provided with two end portions 16 which overlap and rest on the side walls 18 of the pick-up truck 12, all as best seen in FIG. 1.

Figure 2:
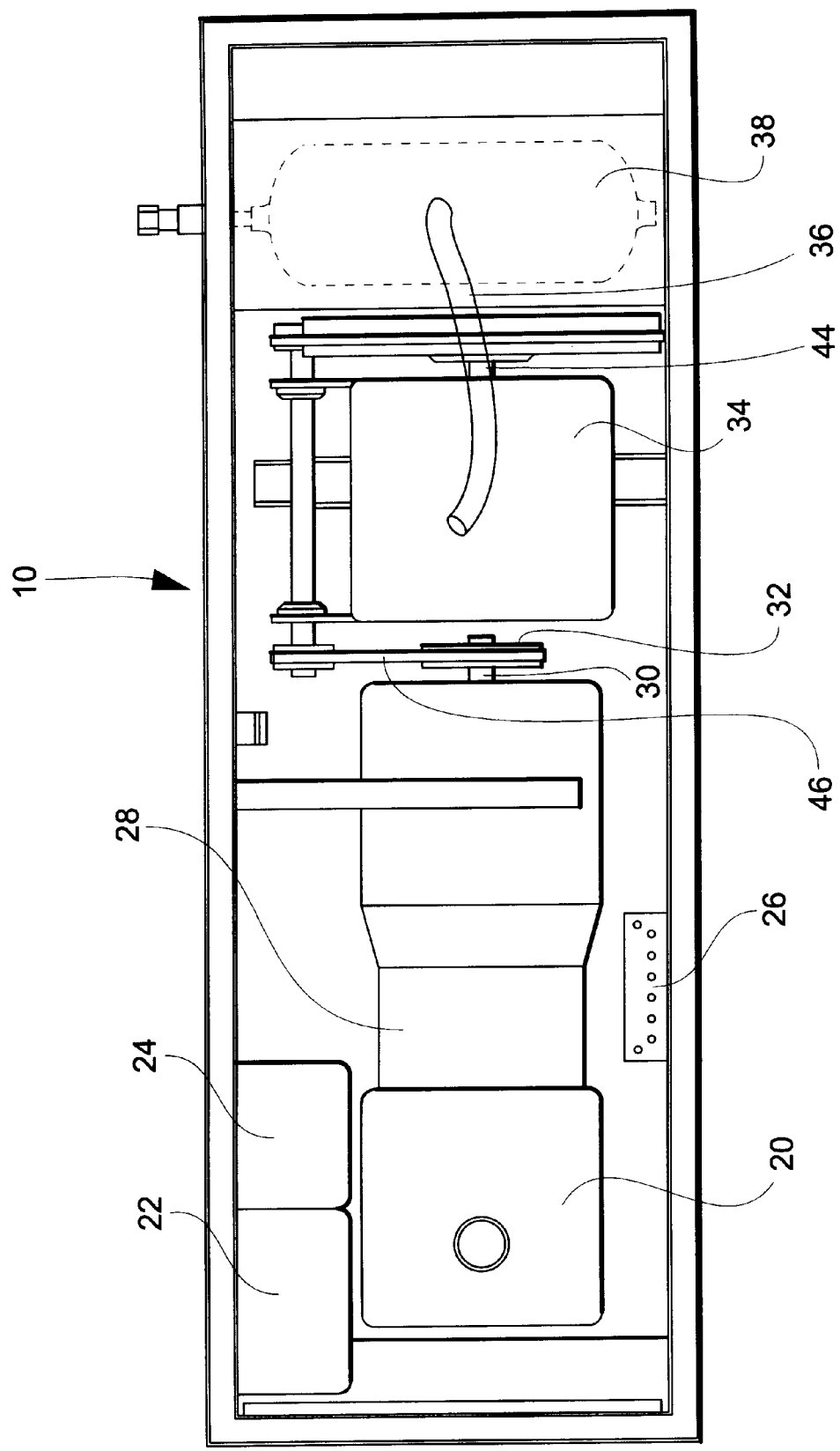
FIG. 2 is a side elevational view of the unit of the present invention.
Figure 3:
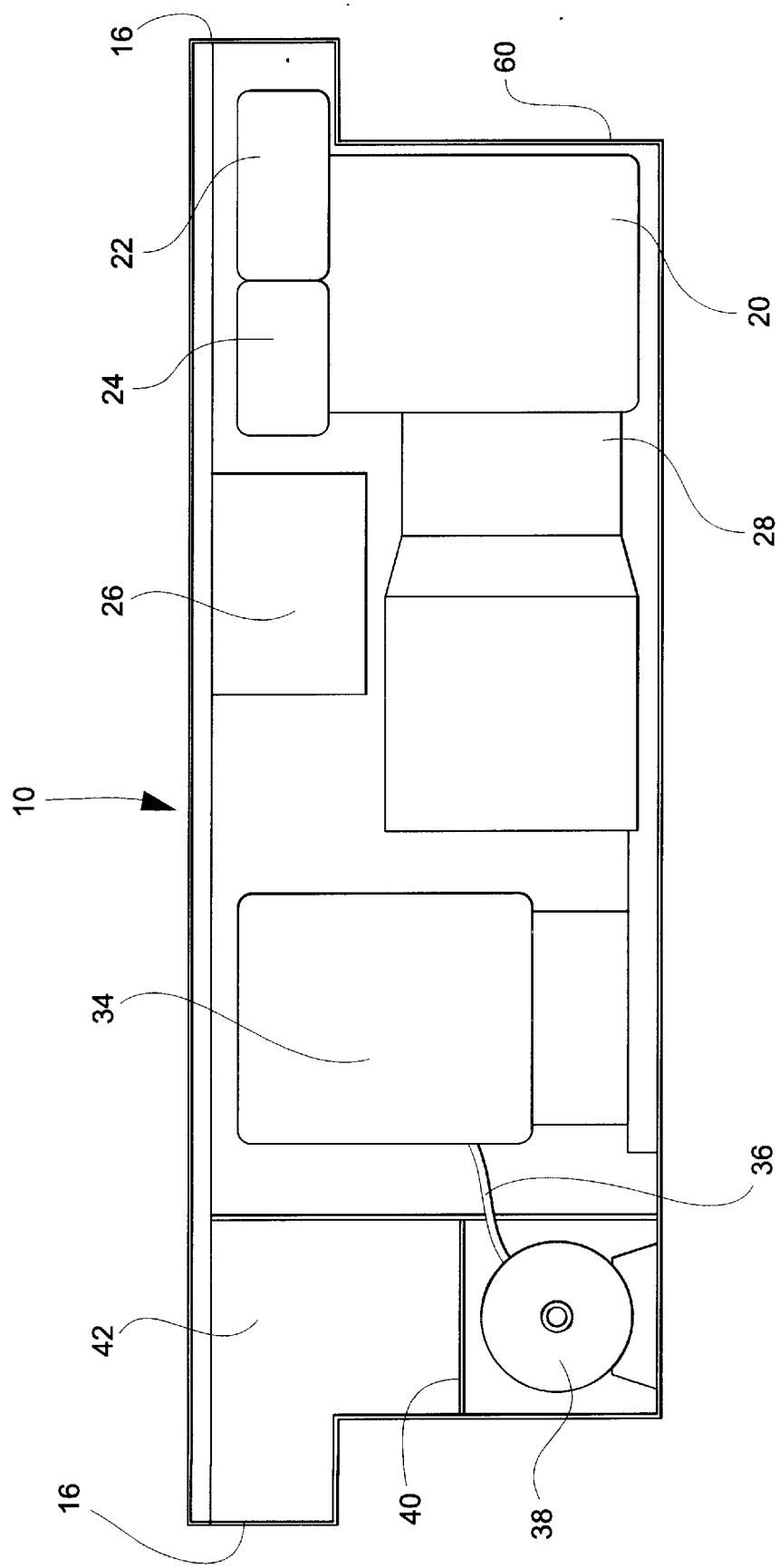
FIG. 3 is a top plan view of the unit of the present invention, with top thereof removed.
Figure 4:
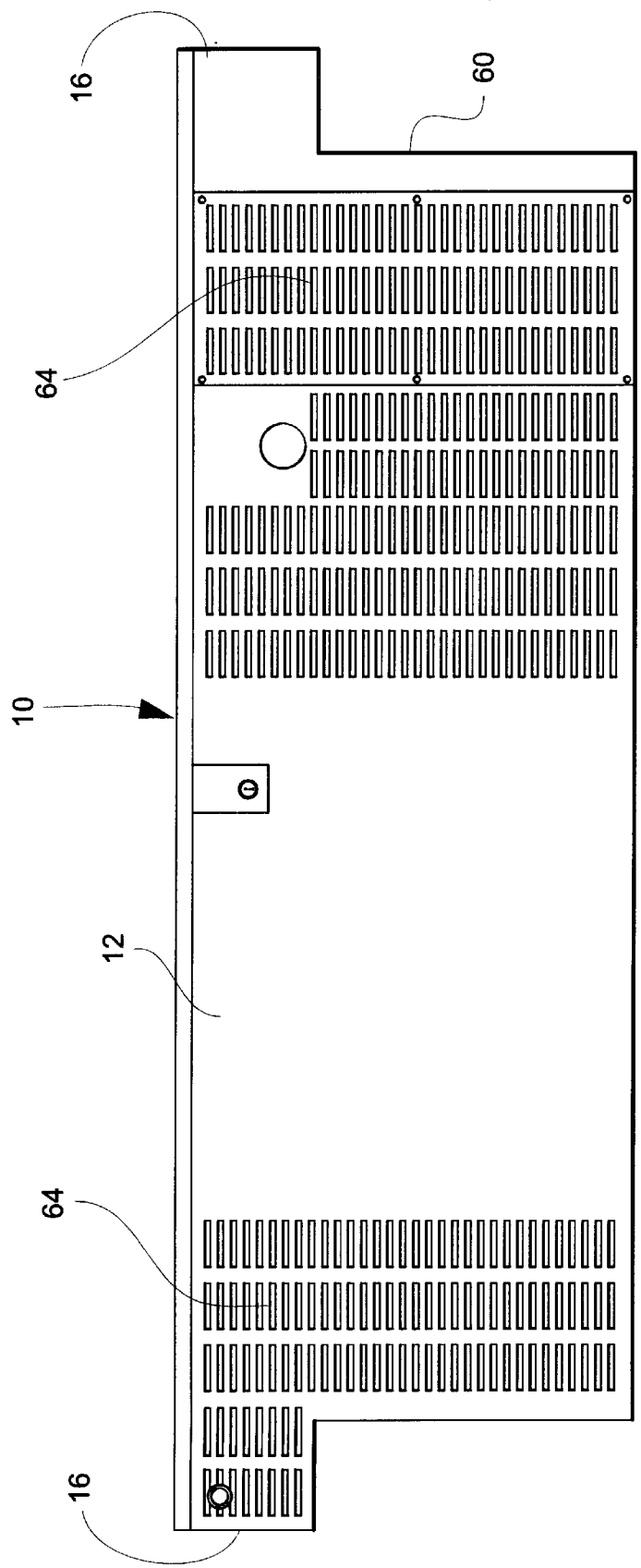
FIG. 4 is an end view of the unit of the present invention.

As best seen in FIGS. 2–4, the housing 14 has a vertical height for receiving and containing components therein, such components being illustrated generally diagrammatically in the drawings and explained in greater detail below.

A conventional internal combustion engine 20 is mounted at one end of the housing 14, and the engine 20 may be provided with an air cleaner 22, a muffler 24, and a battery 26 for starting the engine. An electrical current generating alternator 28 is mounted within the housing 14, and is connected to the engine 20 to be driven thereby. The alternator 28 has an output shaft 30 on which is mounted a drive pulley 32, which will be explained in greater detail presently.

A conventional air compressor 34 is also mounted within the housing 14, and the air compressor 34 has an air outlet hose 36 through which compressed air is conveyed to an air accumulator tank 38 located at one end of the housing 14. As best seen in FIG. 3, the air accumulator tank 38 is mounted in the bottom portion of the housing 14, and it has a vertical height substantially less than the vertical height of the housing 40, whereby horizontal shelf 14 may be fixed in the housing above the air accumulator tank 38 to provide a large storage area 42 in which any desire welding tools (not shown) used with the portable unit 10 may be conveniently stored, such as a plasma cutter, a mig welder, welding leads, nail guns, and/or electric saws.

Figure 6:
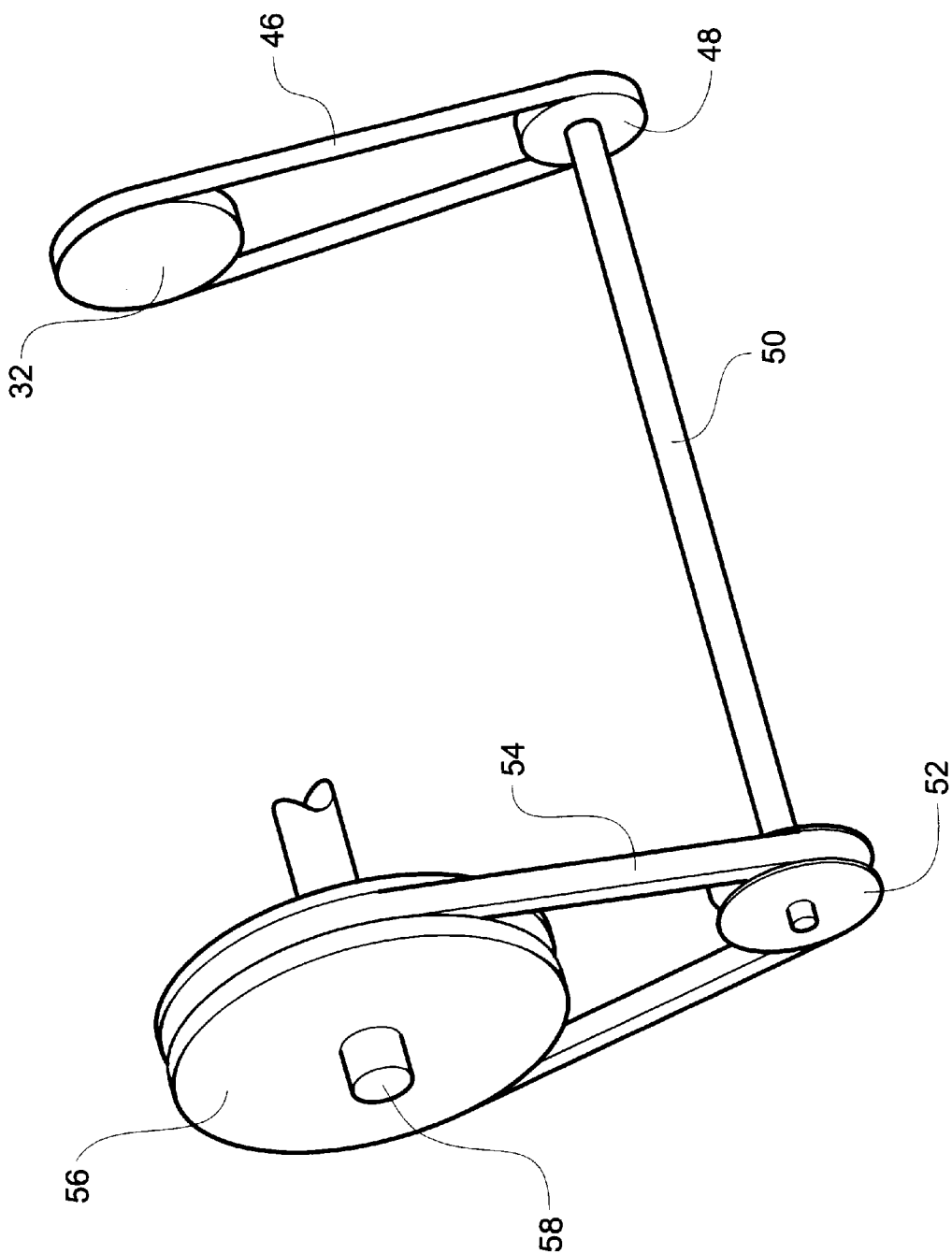

As best seen in FIG. 1, the engine 20, the alternator 28, the compressor 30, and the air accumulator tank 38 are all mounted in the housing 14 in alignment with one another along the longitudinal extent of the housing 14, and the output shaft 30 from the alternator is generally aligned with an input drive shaft 58 for the air compressor 34, this input shaft 44 being driving through a cooperating pulley arrangement as best seen in FIG. 6. This pulley arrangement includes the aforesaid drive pulley 32 which is driven by the output shaft 30 of the alternator 28, and a drive belt 46 connected to a smaller intermediate pulley 48 which is mounted on a common shaft with a second intermediate pulley 52 that is larger than the first intermediate pulley 48. A second drive belt 54 is connected between the second intermediate pulley 52 and a large driven pulley 56 that is connected to the drive shaft 58 for the air compressor 34. It will be noted that because of the different sizes of the four pulleys 32, 48, 52, and 56, a speed reduction is obtained between the drive pulley 32 mounted on the alternator 28 and the driven pulley 56 that drives the air compressor 34. In a typical application, this speed reduction is approximately three to one, but it will be understood that any desired speed reduction can be obtained by the simple expedient of changing the sizes of one or more of the aforesaid pulleys.

Figure 5:
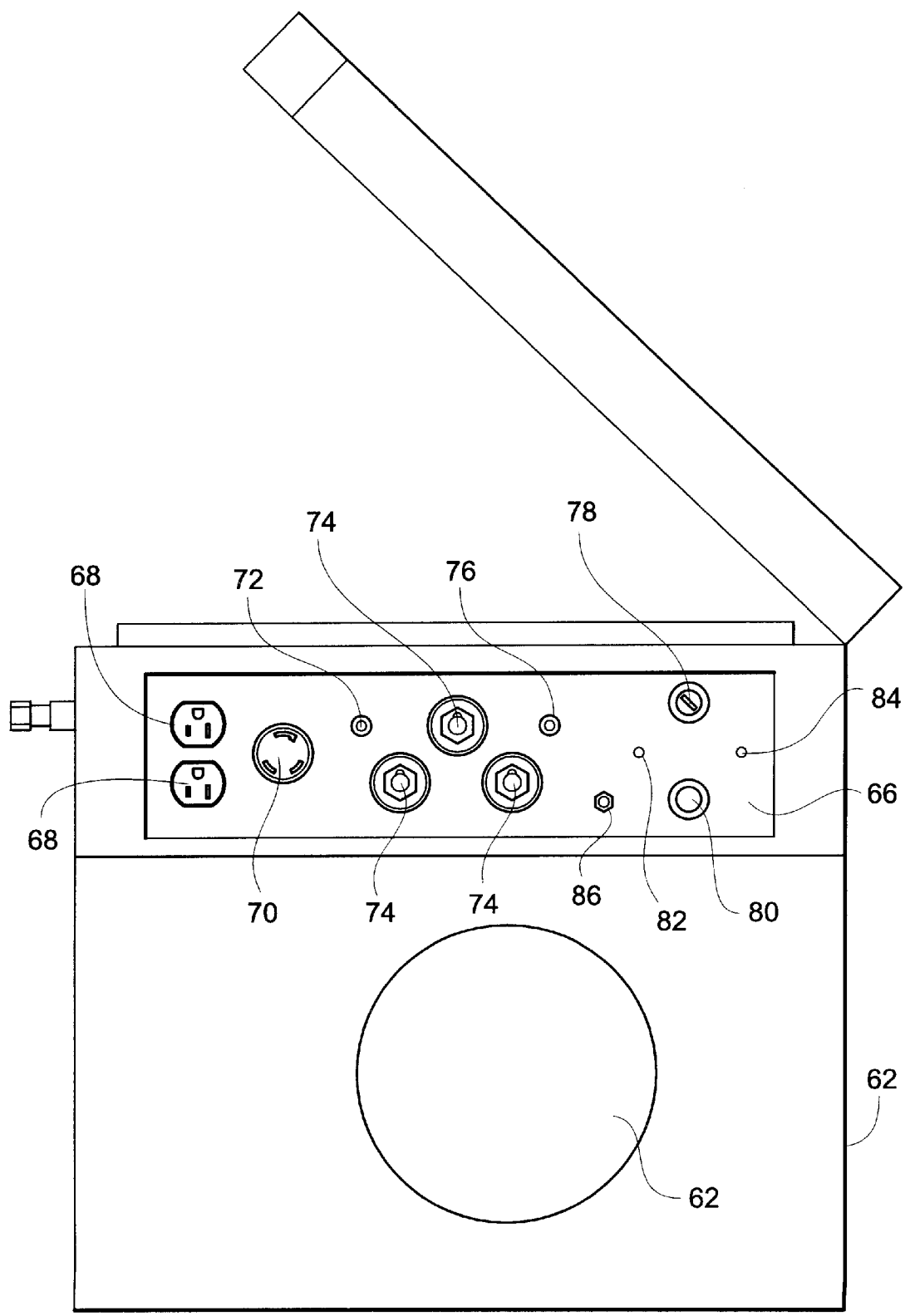
FIG. 5 is a detail view of the pulley drive assembly of the unit of the present invention.

As best seen in FIG. 5, the end wall 60 of the housing 14 which is directly adjacent the internal combustion engine 20 is formed with an opening 62 which serves as an air inlet for the internal combustion engine 20. Additionally, the housing 14 is provided with a plurality of slotted openings or vents 64 through which exhaust air from the various components within the housing 14 is easily vented. Finally, as best seen in FIGS. 1 and 5, the end wall 60 of the housing 14 is provided with a conveniently located an output panel 66 that includes a plurality of outlets for use by welders using the present invention. The output panel 66 includes two 110 volt receptacles 68, a 220 volt receptacle 70, and a circuit breaker 72. Similarly, the output panel 66 also includes a plurality of conventional welding sockets 74, and a second circuit breaker 76. The output panel 66 also includes an on/off key slot 78, and a start button 80 by which the internal combustion engine 20 can be started. Finally, the output panel 66 may also include a warning light 82 for indicating low oil pressure in the internal combustion engine 20, an "on" lamp 84 which is illuminated when current is being generated by the alternator 28, and a conventional ground lug 86. All of the aforesaid elements presented on the output panel 66 are wired in a conventional manner (not shown) to the equipment contained within the housing 14.

It will be apparent from the above that the present invention provides a self-contained, portable and fully integrated unit 10 that can be mounted on the back of a pick-up truck 12 as illustrated in FIG. 1, and the unit 10 can then be easily transported to any site where welding, auxiliary electric power or compressed air are required. Once the pick-up truck has arrived at the site, the welding equipment, which is conveniently stored in the storage area 42 within the confines of the unit 10, can be easily removed and plugged into the various outlets provided by the outlet panel 66 which, it will be noted, is also conveniently located at one side of the pick-up truck 12. This is in substantial contrast to the above-described prior art where it was necessary to load and unload three separate and heavy components, namely the welder, the compressor, and the generator, which would then have to be connected together. Moreover, since the internal combustion engine 20, the alternator 28, and the air compressor 34 are all fully contained within the housing 14, the high noise level normally generated by these units is substantially reduced because of the closed housing 14. In the latter regard, even though these units are confined within the housing 14, the air opening 62 and the vented opening 64 in the housing 14 permit an adequate flow of cooling air through the housing 14. Finally, when a particular welding, cutting or nailing operation is completed, the connected equipment can be quickly and easily removed from the output panel 66 and stored in the storage area 42. Since the housing 14 will normally include any convenient conventional locking mechanism (not shown), all of the connecting equipment will be maintained in a safe storage area, and can remain within the housing and on the pick-up truck 12 overnight. By contrast, in prior art arrangements, it was generally necessary to unload the equipment from a pick-up truck at the end of each day and to put such equipment in a secure location so that it would not be stolen.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A self-contained, portable and fully integrated welder/generator and compressor unit that is capable of being loaded onto and carried by a pick-up, said unit comprising:

(a) a housing having an extending length corresponding generally to the width of a pick-up truck, and having a vertical height for receiving and containing components;

(b) an engine mounted within said housing;

(c) an electrical current generating alternator mounted within said housing and connected to said engine to be driven thereby, said alternator having an output drive shaft;

(d) an air compressor having a compressed air outlet mounted within said housing, said compressor, said alternator and said engine being mounted in said housing in a generally longitudinal alignment to fit within said housing;

(e) drive means mounted within said housing and connecting said output drive shaft of said alternator to said air compressor to drive said compressor; and (f) an output panel located in a wall of said housing and including electrical outlets and welding lead receptacles connected to said alternator.

2. A unit as defined in claim 1, wherein said housing is T-shaped in cross section along said extending length thereof to provide two end portions for overlapping and resting on the side walls of the bed of the pickup truck, and wherein one of said end portions includes a side wall for receiving said output panel.

3. A unit as defined in claim 1, wherein a compressed air accumulator tank is mounted in said housing and is connected to said compressed air output of said air compressor, said accumulator tank having a vertical height substantially less than said vertical height of said housing, and said housing having a shelf located above said air compressor and forming a storage compartment for welding tools, nail guns or the like within said housing.

4. A unit as defined in claim 3, wherein said engine, said alternator, said compressor, and said air accumulator tank are mounted in said housing in alignment with one another along said extending length of said housing.

5. A unit as defined in claim 1, wherein said engine, said alternator, and said compressor are mounted in said housing in alignment with one another along said extending length of said housing.

6. A unit as defined in claim 1, wherein said drive means includes cooperating pulleys of predetermined sizes and drive belts associated therewith to provide a speed reduction drive between said output shaft of said alternator and said compressor.

7. A unit as defined in claim 1, wherein said housing is provided with air vents adjacent said engine and said compressor for exhausting hot air from within said housing.

8. A self-contained, portable and fully integrated welder/generator and compressor unit that is capable of being loaded onto and carried by a pick-up, said unit comprising:

(a) a housing having an extending length corresponding generally to the width of a pick-up truck and having a vertical height for receiving and containing components, said housing having a T-shaped cross-section along its extending length to provide two end portions for overlapping and resting on the side walls of the bed of the pickup truck;

(b) an engine mounted within said housing adjacent one of the extending ends of said housing;

(c) an electrical current generating alternator mounted within said housing next to said engine and aligned therewith along said extending length of said housing, said alternator being connected to said engine to be driven thereby, and said alternator having an output drive shaft having a drive pulley connected thereto;

(d) an air compressor having a compressed air outlet mounted within said housing adjacent to said alternator and aligned therewith along said extending length of said housing, said air compressor having a compressed air outlet;

(e) a compressed air accumulator tank mounted within said housing adjacent said air compressor and being connected to said air outlet thereof, said air compressor having a driven pulley connected thereto for driving said air compressor;

(f) a belt and pulley connecting means mounted within said housing and connecting said drive pulley and said driven pulley to cause said compressor to be operated by said output shaft of said alternator; and (g) an output panel located in a wall of one of said end portions of said housing and including electrical outlets and welding lead receptacles connected to said alternator.

9. A unit as defined in claim 8, wherein said accumulator tank has a vertical height substantially less than said vertical height of said housing, and wherein said housing is provided with a shelf located above said air compressor and forming a storage compartment for welding tools, nail guns and like within said housing.

* * * * *